April 7, 1970    R. GOETGHELUCK    3,505,441
PROCESS FOR THE MANUFACTURE OF PLASTIC ARTICLES
HAVING A CRACKLE FINISH
Filed Jan. 16, 1967    3 Sheets-Sheet 1

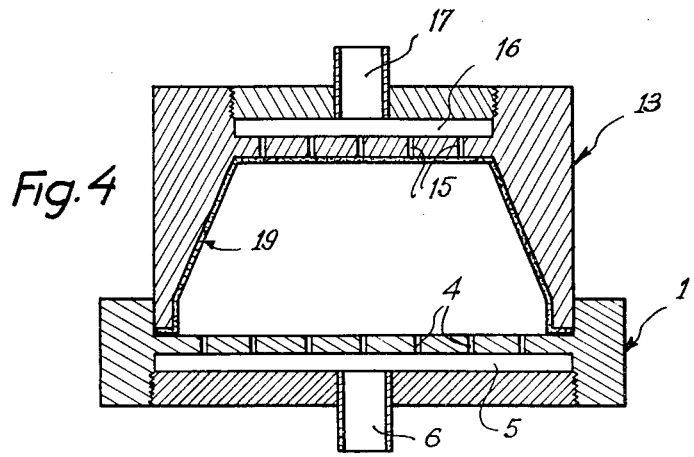
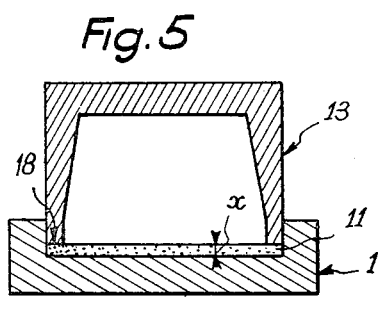
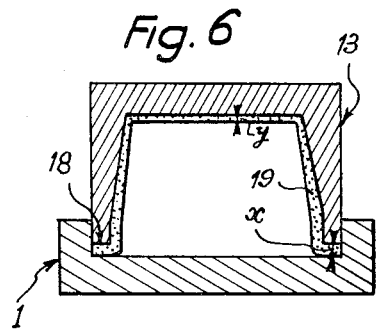
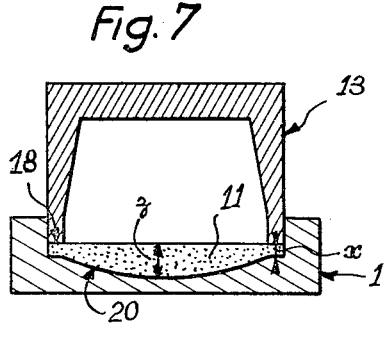
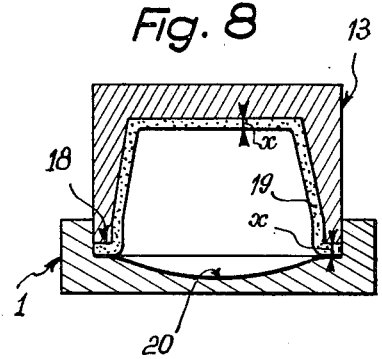

United States Patent Office 3,505,441
Patented Apr. 7, 1970

3,505,441
PROCESS FOR THE MANUFACTURE OF PLASTIC ARTICLES HAVING A CRACKLE FINISH
Rémi Goetgheluck, Steenvoorde, France, assignor to Societe N.G.T., County of Bagneaux, France, a company of France
Continuation-in-part of application Ser. No. 476,002, July 30, 1965. This application Jan. 16, 1967, Ser. No. 609,331
Claims priority, application France, Jan. 17, 1966, 46,167
The portion of the term of the patent subsequent to Oct. 7, 1986, has been disclaimed
Int. Cl. B29c 17/04
U.S. Cl. 264—89                                   2 Claims

ABSTRACT OF THE DISCLOSURE

A crackle finishing process in which a thermoplastic material is introduced into a cavity in a quantity equal to that constituting the finished article and selectively heated to soften the material on the side or sides which is to receive the crackle finish and heated to plasticize the material on the other sides. The material is then compressed by a punch while controlling the temperature of the punch and exhausting gases to form a homogeneous blank. A forming mold is positioned on the blank in a manner such that the marginal portion of the blank is fixed between the forming mold and the mold cavity. The blank is then applied to the inner wall of the forming mold by pressure differential.

BACKGROUND OF THE INVENTION

This application is a continuation-in-part of application Ser. No. 476,002, filed July 30, 1965.

Application Ser. No. 476,002 relates to a method of manufacturing objects made of plastic or having at least one plastic state, such as containers of various kinds by a shaping process involving suction and/or blowing, this method being characterized by the steps of introducing into a flat blank-mold the starting material in the form of a liquid, paste, powder, grains or a mixture thereof, in a quantity strictly equal to that constituting the end product, of subjecting this quantity of starting material to the uniform action of a source of heat or cold whereby to fetch it rapidly to the plasticizing temperature, of compressing the plasticizer material in order to obtain a homogeneous blank in the shape of a thin plate, of covering the blank with a shaping mold whereby to fixedly restrain the edge of the blank between the blank-mold and the shaping mold, of sucking air through the walls of the shaping mold and/or blowing compressed air through the walls of the blank-mold whereby to apply the blank against the inner walls of the shaping mold, of separating the two molds while using air suction to retain the object thus shaped in the shaping mold, and of cooling the end product and finally stripping the same from the shaping mold.

The present invention relates to an improvement of this method, and its object is notably to impart a surface crackle-finish to the end product, either inside or outside, or on both sides of the wall thereof.

In accordance with this invention, this object is achieved by introducing the starting material into the blank-mold in the form of a liquid, paste, powder, grains or mixture thereof and subjecting the side or sides to receive the crackle finish to a softening temperature lower than the plasticizing temperature of the raw material, and the other sides to the plasticizing temperature, followed by compressing of the material to obtain a thin plate-shaped homogeneous blank. The blank is then processed in the manner described in the above noted patent application, including positioning a forming mold over the homogeneous blank so as to maintain the edge of the homogeneous blank fixed between the blank mold and said forming mold, establishing a pressure differential between the interior of the forming mold and the surface of the homogeneous blank adjacent the shallow blank mold so as to deform the homogeneous blank against the interior surface of the forming mold to form an article of desired shape, retracting the forming mold from the blank mold such as to remove the article therefrom, and cooling the article and ejecting the article from the forming mold.

The present invention will be more fully understood from the following description of two embodiments of the process and of one embodiment of the apparatus, given by way of example, reference being made to the accompanying drawings.

BRIEF DESCRIPTION OF THE DRAWINGS

FIGS. 3 and 4 are diagrammatic sections of the forming mold and of the blank mold before and after the forming step;

FIGS. 5 to 8 are diagrammatic sections of the forming mold and the blank mold, showing the manufacture of a finished article from blanks, with and without extra thickness;

DESCRIPTION OF THE PREFERRED EMBODIMENTS

Figure 1:
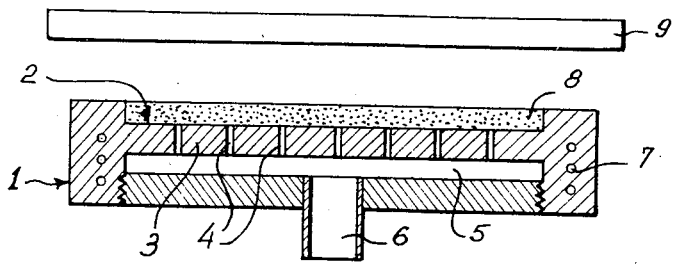
FIG. 1 is a diagrammatic section of the heating unit and the blank mold, for use in the method of the invention.

As can be seen in FIG. 1, the shallow blank mold 1 comprises a circular and flat-bottomed cavity 2, an intermediate layer 3 formed with passages 4 or a layer 3 consisting of gas-pervious material, such as a sintered metal or a porous ceramic, a chamber 5 situated beneath the layer 3 and connected by means of a pipe 6 to a source of gas under pressure or to a vacuum pump. The mold 1 is equipped with temperature control elements 7, such as conduits embedded in the mass forming the blank mold 1 and capable of being supplied with a hot or cold fluid.

The first operating stage in the manufacture of the plastic article, such as a container, consists in introducing the initial material 8, such as thermoplastic materials, into the cavity 2. In general, it is possible to use as initial material any material which can be deformed at a certain temperature. This material may be in the form of liquids, pastes, powders, granules or even a mixture of these latter forms. The quantity of the initial material 8 is predetermined and is such that it corresponds exactly to that of the material constituting the finished article so that there are no losses of material arising from a subsequent finishing of the completed article. The volume of the cavity 2 is such that it is only able to receive the predetermined quantity of the initial material 8.

The blank mold 1, filled with the starting material 8, is then positioned beneath a heating unit 9 which for example emits an infrared radiation. According to requirements, the blank mold 1 is heated or cooled by the control elements 7 and, while it is displaced beneath the said heating unit 9, the starting material 8 is subjected to a heating or cooling treatment to bring it to selected temperatures as set forth below. By the expression "heating or cooling treatment," is meant a heating or cooling of the starting material until the temperatures are reached, or the maintaining of the starting material at these temperatures. The starting material can be introduced into the mold either at a lower temperature or at a higher than one of the selected temperatures.

The apparatus for carrying this method into practice is the same as that specified in the above noted patent application.

The temperature is selected in ordr to obtain a crackle finish, the side to which such a finish is to be imparted is heated or cooled to a temperature below the plasticising temperature whereas the other side is heated or cooled until it reaches the platicizing temperature. This selective heating imparts to the blank the desired temperatures at the surfaces thereof which temperatures may be equal or different whereby the crackle finish may be on one or more sides of the article. If the temperature on both sides of the blank is at the softening temperature of the material, the crackle finish will be obtained on both sides of the finished article.

Due to the fact that the thickness of the layer of starting material 8 is generally small, the selected temperatures are reached fairly quickly and can easily be maintained. The gases which possibly form in the starting material 8 during the heating or the polymerization thereof are able to escape into the atmosphere.

Figure 2:
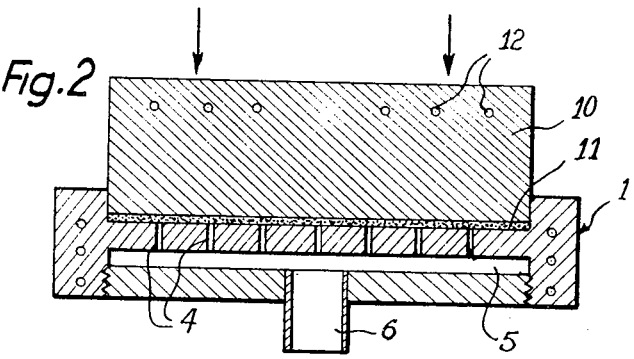
FIG. 2 is a diagrammatic section of the compression punch and the blank mold of FIG. 1.

When the temperatures have been reached, the blank mold 1 is positioned underneath a compression station, having a punch 10, capable of fitting tightly into the cavity 2 of the mold, the punch then compressing the material 8 with a predetermined pressure P to transform it into a homogeneous blank 11. The remaining gas bubbles are able to escape through the passage 4, either under the action of the pressure of the punch 10 alone or under the action of the pressure of this punch 10 in combination with the vacuum produced in the chamber 5 by a vacuum pump connected thereto by means of the pipe 6 when the blank mold 1 is underneath the punch 10 (FIG. 2).

The punch 10 is also provided with regulating elements 12, such as conduits fed with a hot or cold fluid, so that the homogeneous blank 11 is continuously maintained at the selected temperatures.

Figure 3:
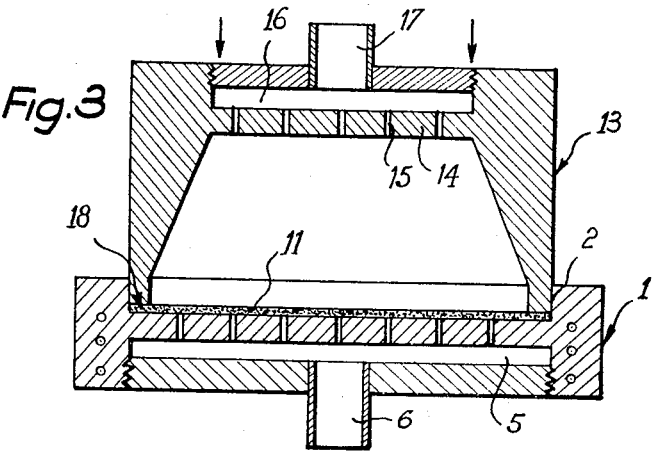

Thereafter, after having raised the compression punch 10, the blank mold 1 is positioned beneath the forming station which comprises at least one forming mold 13, FIG. 3, having the negative form of the finished article which it is desired to produce. The bottom of the forming mold 13 is formed by an intermediate layer 14 having passages 15 or by a layer of porous sintered metal or by a layer of porous ceramic. A chamber 16 disposed above the intermediate layer 14 may be connected by means of a pipe 17 to a vacuum pump or to a source of compressed air. The forming mold 13 has an external contour which fits exactly and tightly in the cavity 2 of the blank mold 1. When the forming mold 13 is applied with a pressure $P_1$ (which is generally lower than the pressure P) to the blank 11, the lower edge 18 of the mold 13 serves as a locking plate and maintains the marginal portion of the blank 11 against the bottom of the cavity 2 (FIG. 3).

The blank 11 is then deformed and is applied to the internal wall of the forming mold 13 under the effect of a pneumatic excess pressure produced in the chamber 5 of the blank mold 1 and/or of a vacuum produced in the chamber 16 of the forming mold 13. The blank 11 is thus given the shape which it is desired to have for the finished article 19. After removing the forming mold 13 from the blank mold 1, which is carried out while still maintaining a certain vacuum in the chamber 16, and after cooling the finished article 19, this article is removed from the mold by bringing the chamber 16 to atmospheric pressure or to a slight superatmospheric pressure, so that the finished article 19 falls out or is ejected from the forming mold 13 (FIG. 4).

It will be appreciated that the final minimum thickness of a molded article is a function of the depth of the latter and of the initial thickness of the blank in sheet form. As can be seen from FIGS. 5 and 6, the flat blank 11 of a uniform thickness $x$ gives, after the blank 11 has been molded, an element 19 of which the walls and the bottom have different thicknesses. In particular, the bottom of the element 19 only has a small thickness $y$, while the rim of the element 19 has maintained its intial thickness $x$.

In order to obtain a uniform thickness of the walls of the finished article 19, it is advantageous to use a blank 11 of which at least one of the faces is concave. In other words, the thickness of the blank 11 varies from one region to another; in this specific case, the blank 11 has in its marginal zone a thickness $x$ which corresponds to the thickness of the walls at the bottom of the finished article and which increases towards the center of the blank 11, where it has a thickness $z$. Because of the localized extra thicknesses, when such a blank 11 has been molded by suction and/or by blowing, the finished article 19 has walls of uniform thickness $x$ (FIGS. 7 and 8). By modifying the position and the amount of the extra thickness in the blank, it is also possible to locate in the finished article areas of extra thickness which have any predetermined form.

Such a blank 11 is obtained by providing in the blank mold 1 a recess 20 which is for example of curved form. Instead of providing the recess in the blank mold 1, the recess 20 can also be formed in the lower end of the compression punch 10. In order to simplify the drawings, the air-porous layers 3, 14 and the chambers 5, 16 respectively provided in the blank mold 1 and in the forming mold 13 have not been shown in FIGS. 5 to 13.

Figure 13:
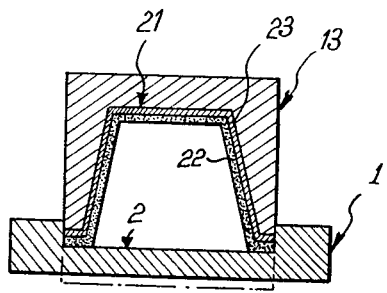

FIGS. 9 to 13 illustrate diagrammatically one method of manufacturing a finished article 21, of which the walls are formed by two layers 22, 23 of different materials, FIG. 13. For this purpose, a starting material 24 is introduced into the cavity 2 of the blank mold 1 so as completely to fill the cavity 2. After having been brought to the selected temperatures, the starting material 24 is formed into a blank 22 by means of the punch 10, FIG. 10. The same cavity 2 is then completely filled with another starting material 25, while leaving the blank 22 in position in the blank mold 1, FIG. 11. After a heating or cooling treatment and compression of the material 25, a second blank 23 is obtained which adheres fast to the first blank 22. There is thus obtained a complex blank 22, 23, of which the component materials may have different physical and chemical characteristics. The complex blank 22, 23 is then subjected to forming and demolding operations and there results a finished article 21 whose internal wall and external wall are formed of different materials.

Figure 9:
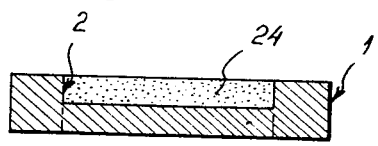
FIGS. 9 to 13 are diagrammatic sections of the blank mold, the compression punch and the forming mold, these sections showing the successive steps in manufacture of a complex blank and of the container.
Figure 10:
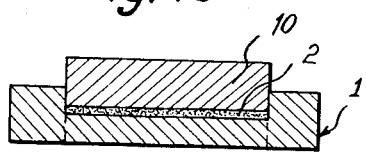
Figure 11:
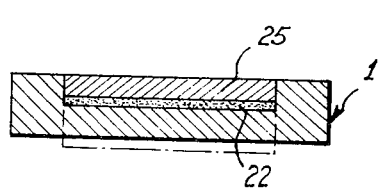
Figure 12:
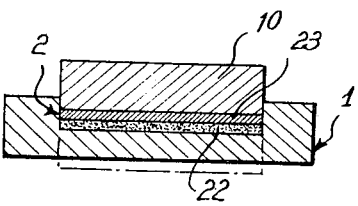

In the case of manufacturing a complex blank, it may be advantageous to make a part of the bottom of the blank mold 1 capable of vertical movement, this part being defined by the vertical walls of the cavity 2 (see chain-dotted lines in FIGS. 9 to 3). Means are also provided which permit the movable bottom of the blank mold to be kept fixed in a position appropriate for the formation of a complex blank.

The preparation of a complex blank is not limited to the example as previously described, since it is possible to modify the number and thickness of the layers of starting materials, as well as the combination of the different working phases, such as filling, heating or cooling and compression. Thus, it is, for example, possible to produce a complex blank by filling the mold with two layers of different starting materials, without previous heating or cooling and compression of the first layer of starting material.

It may also be advantageous to deposit on the formed blank and at prescribed regions of the blank, materials which give the finished article a decorative effect or physical properties different from those of the thermoplastic plastics. Thus, powders of any appropriate mtaerial can serve to form inscriptions on the blank. It is also possible to use labels which have a seal or a trademark device. Once these powders and labels have been deposited on the plastic blank, they are embedded in the latter, either by means of a punch, or at the time of molding the article when the blank is applied to the walls of the forming mold. When using a magnetized metallic powder, it would be possible to manufacture for example beakers which, by means of a permanent magnet, could be fixed to walls, sloping shelves, etc. By means of this method of manufacture, articles are obtained of which the decorations or inscriptions conform with the external wall of the article.

The embodiment of the apparatus as described above and in the above cited patent application is not limitative. In another embodiment, the blank molds 1 could be displaced along a rectilinear path and the rectilinear path of the forming molds 13 could be perpendicular to the path of the blank molds 1. The blank molds 1, after formation of the finished article 19, would then be sent to the starting station situated ahead of a charging station.

It may be advantageous to provide several successive sections of the heating unit and to arrange a charging section for initial material at the inlet to each section and a compression station at the outlet from each section.

Similarly, in order to increase the rate of manufacture of the articles 19, it would be possible to multiply the blank molds and the forming molds so as to permit the simultaneous production of several blanks 11 and several finished articles 19. For this purpose it would be necessary to multiply in corresponding manner the number of compression stations, vertical displacement stations for the forming molds and charging stations.

What I claim is:
1. A process for the manufacture of articles having a crackle finish from plastic material, comprising the steps of:
   (a) introducing a starting material in a quantity exactly equal to that constituting the finished article into the cavity of a shallow blank mold;
   (b) subjecting the starting material to a heat transfer treatment to bring said starting material to a softening temperature on the sides to receive the crackle finish and to the plasticization temperature to plasticize said material on any side not receiving a crackle finish;
   (c) compressing said material by introducing a punch thereagainst;
   (d) controlling the temperature of said punch and exhausting gases formed during the compression of said plasticized material so as to form a homogeneous blank in the form of a thin sheet;
   (e) retracting said punch;
   (f) positioning a forming mold over said homogeneous blank so as to maintain the edge of said homogeneous blank fixed between said blank mold and said forming mold;
   (g) establishing a pressure differential between the interior of said forming mold and the surface of said homogeneous blank adjacent said shallow blank mold so as to deform said homogeneous blank against the interior surface of said forming mold to form an article of desired shape;
   (h) retracting said forming mold from said blank mold such as to remove said article therefrom; and
   (i) cooling said article and ejecting said article from said forming mold.
2. The process as defined in claim 1 wherein step (b) the temperature is brought to the softening temperature on both sides of the starting material whereby a crackle finish is obtained on both sides of the article.

References Cited

UNITED STATES PATENTS 3,048,537    8/1962    Pall et al. _____ 264—126 X

FOREIGN PATENTS 737,111    9/1955    Great Britain.
816,713    7/1959    Great Britain.

ROBERT F. WHITE, Primary Examiner

J. H. SILBAUGH, Assistant Examiner

U.S. Cl. X.R.

264—92, 327; 18—19